United States Patent [19]

Carlson

[11] 4,125,221
[45] Nov. 14, 1978

[54] TEMPERATURE-DEPENDENT LIQUID METAL FLOWRATE CONTROL DEVICE

[75] Inventor: Roger D. Carlson, LaGrange, Ill.

[73] Assignee: The United States of America as represented by the United States Department of Energy, Washington, D.C.

[21] Appl. No.: 831,193

[22] Filed: Sep. 7, 1977

[51] Int. Cl.² .......................................... G05D 23/26
[52] U.S. Cl. ..................................... 236/93 R; 236/88
[58] Field of Search ................. 236/88, 93 R; 137/13, 137/468, 827, DIG. 10

[56] References Cited

U.S. PATENT DOCUMENTS

| | | | |
|---|---|---|---|
| 2,513,779 | 7/1950 | Bailey | 236/88 |
| 2,601,579 | 6/1952 | Witmann | 236/88 |
| 2,977,090 | 3/1961 | McCarty et al. | 236/88 |
| 3,513,881 | 5/1970 | Kinsell | 236/93 X |

FOREIGN PATENT DOCUMENTS 400,762  4/1974  U.S.S.R. .................................. 236/88

*Primary Examiner*—Carlton R. Croyle
*Assistant Examiner*—Leonard E. Smith
*Attorney, Agent, or Firm*—Dean E. Carlson; Frank H. Jackson

[57] ABSTRACT

A temperature-dependent liquid metal flowrate control device includes a magnet and a ferromagnetic member defining therebetween a flow path for liquid metal, the ferromagnetic member being formed of a material having a curie temperature at which a change in the flow rate of the liquid metal is desired. According to the preferred embodiment the magnet is a cylindrical rod magnet axially disposed within a cylindrical member formed of a curie material and having iron pole pieces at the ends. A cylindrical iron shunt and a thin wall stainless steel barrier are disposed in the annulus between magnet and curie material. Below the curie temperature flow between steel barrier and curie material is impeded and above the curie temperature flow impedance is reduced.

7 Claims, 7 Drawing Figures

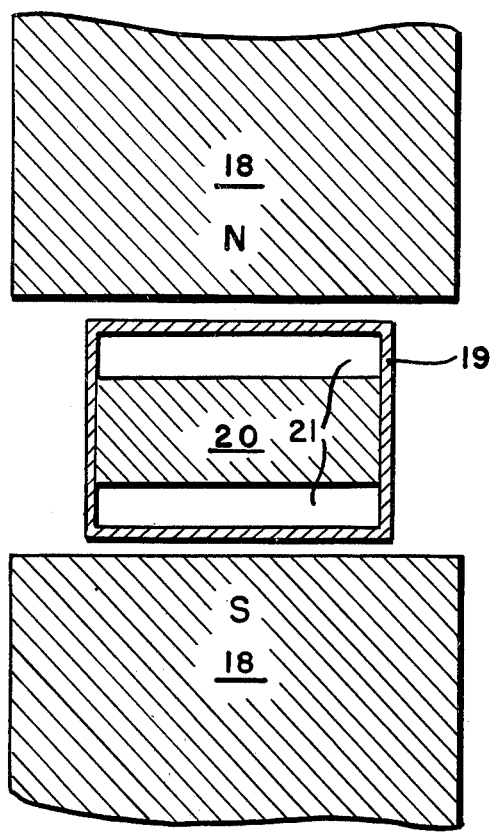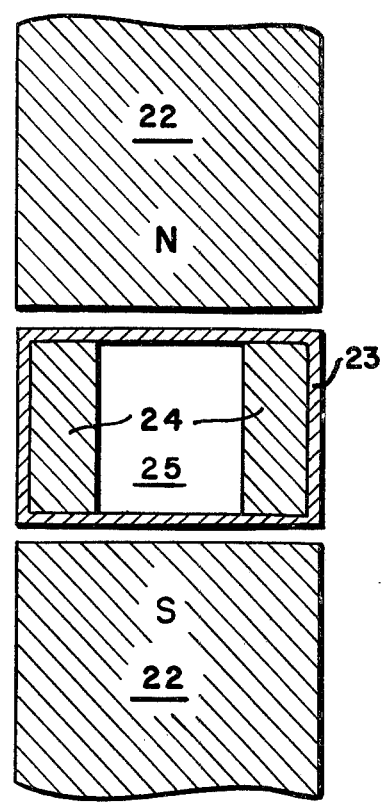

TEMPERATURE-DEPENDENT LIQUID METAL FLOWRATE CONTROL DEVICE

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

Temperature-responsive flow rate control devices for liquid metal systems are useful in a number of different technological areas. For example, such a control device can be employed in a solar collector where sunlight is concentrated upon a small sodium-cooled collector. The device throttles the flow to assure a constant high temperature reservoir with varying atmospheric conditions and changing sun angle. Employment of constant temperature reservoirs would allow optimum design of heat exchangers. Because low efficiencies are characteristic of solar devices, even small increases in heat exchanger performance would have a sizable overall system effect.

In addition, such a device is useful to control the exit temperature of Liquid Metal Fast Breeder Reactor (LMFBR) blanket assemblies. In an LMFBR there is a power shift from core to blanket during each fuel cycle due to burnup of fissionable material in the core and production of fissionable material in the blanket. Power changes of at least a factor of two are predicted for individual blanket assemblies during a single fuel cycle. Also fuel assemblies produce less power as they age due to burnup. Providing the blanket assemblies with variable orifices would make it possible to divert some of the fuel coolant to the blanket assemblies and thus also stabilize fuel assembly temperatures.

SUMMARY OF THE INVENTION

A temperature-dependent liquid metal flow rate control device includes a magnet and a ferromagnetic member defining therebetween a flow path for liquid metal, the ferromagnetic member being formed of a material having a curie temperature at which a change in the flow rate of the liquid metal is desired. According to the preferred embodiment the magnet is a cylindrical rod magnet axially disposed within a cylindrical member formed of a curie material and having iron pole pieces at the ends. A cylindrical iron shunt and a thin wall stainless steel barrier are disposed in the annulus between magnet and curie material. Below the curie temperature flow between barrier and curie material is impeded and above the curie temperature flow impedance is reduced.

BRIEF DESCRIPTION OF THE FIGURES

FIG. 6 is a sketch of a third embodiment of the invention, and FIG. 7 is a sketch of an alternate embodiment of the invention in which an opposite effect is attained.

DESCRIPTION OF THE PREFERRED EMBODIMENT

Figure 1:
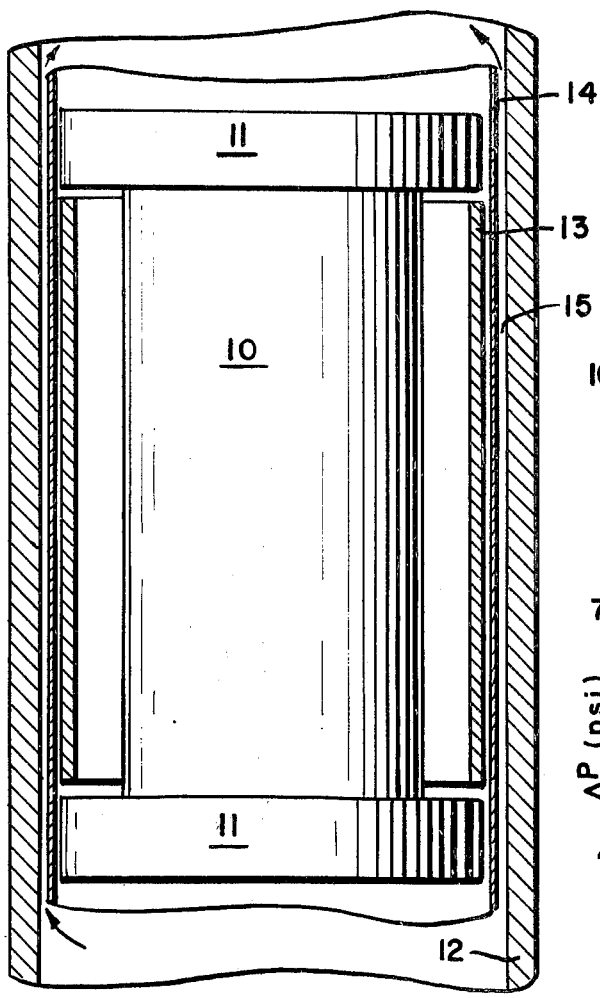
FIG. 1 is a diagrammatic longitudinal section of a temperature-dependent liquid metal flow rate control device according to the present invention.

One embodiment of the invention designed specifically as a test model is shown in FIG. 1. While details of a practical embodiment of the invention useful, for example, in a nuclear reactor would differ from those of the test model shown, the principle of operation would be identical.

As shown in FIG. 1, a rod-shaped bar magnet 10 having iron pole pieces 11 at the ends thereof is axially disposed within a cylindrical member 12 formed of a curie material. A cylindrical iron shunt 13 having the same diameter as the pole pieces 11 extends between the pole pieces but does not touch them and a thin wall stainless steel tube 14 is spaced away from the curie material in the annulus between the magnet and the curie material. Tube 14 and cylindrical member 12 define therebetween an annular flow path 15 for liquid metal.

Flow of a liquid metal through the device described above will increase when the temperature is increased and decrease when the temperature is decreased. This is due to a combination of the effect of Faraday's law and the curie point. According to Faraday's law, flowing a liquid electrical conductor through a magnetic field generates a voltage and a resisting force. Temperature sensitivity is obtained by employing a curie material having a curie point at the desired temperature. A curie material is ferromagnetic below the curie point and paramagnetic above the curie point and the magnetic permeability of the material is a function of how close the temperature of the curie material is to the curie point. Use of a curie material in a magnetic circuit near the curie temperature will result in a temperature-sensitive magnetic circuit; that is, the magnetic flux is temperature dependent. Since the flow path is also in the circuit, the pressure drop is temperature dependent because the pressure drop is proportional to the flux and the flux is proportional to the permeability.

Referring again to FIG. 1, a liquid metal or other conducting liquid flows between tube 14 and cylindrical member 12. The magnetic circuit has two parallel paths; one is across the liquid metal flow path and along the curie material of member 12; the other is along iron shunt 13. Below the curie temperature, the curie material has a high magnetic permeability and the liquid metal flow through a large magnetic flux. Above the curie temperature, the magnetic lines of flux follow the iron shunt and bypass the sodium. A temperature below but near the curie temperature results in a smooth transition between the two circuits.

Details of the test model will next be given. This test model employes an Alnico 5 (8% Al, 14% Ni, 24% Co, 3% Cu, balance Fe) magnet and the curie material is 50% iron and 50% nickel having a curie temperature of 500° C. The magnet is 2.00 inches in diameter and 4 inches long and the pole pieces are 2.87 inches in diameter and 0.50 inch thick. The iron shunt has an inner diameter of 2.67 inches and an outer diameter of 2.87 inches. The barrier tube is formed of Type 304 stainless steel and is 2.88 inches in inner diameter and 2.94 inches in outer diameter. The magnet may be a permanent magnet or an electromagnet.

Figure 3:
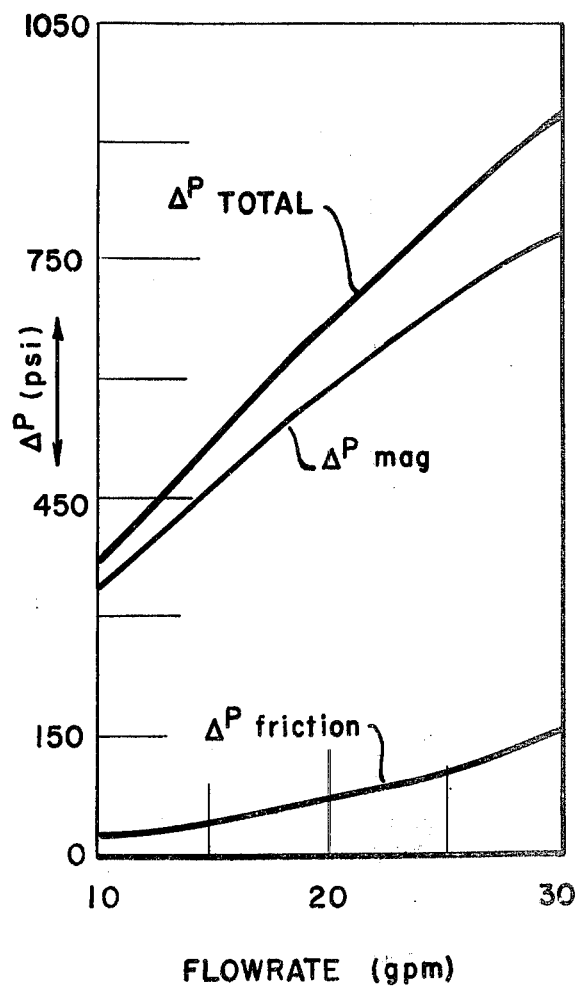
FIG. 3 is a graph in which the pressure drop of a liquid metal flowing through the device of FIG. 1 is plotted as a function of flow rate.
Figure 2:
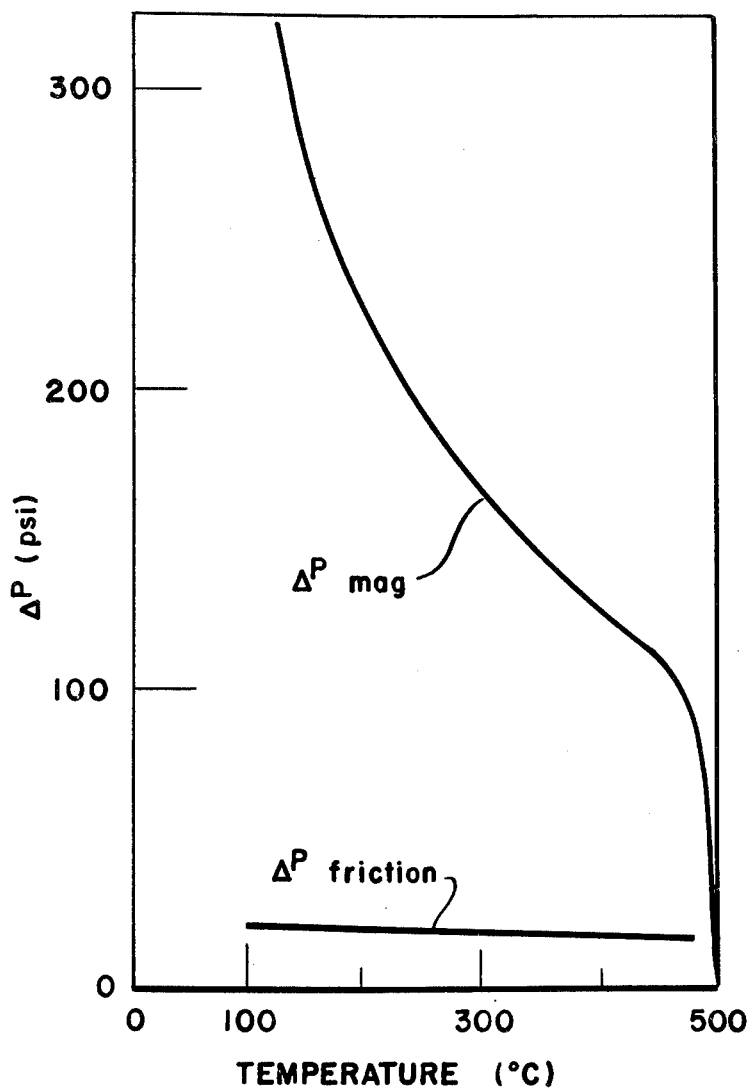
FIG. 2 is a graph in which the pressure drop of a liquid metal flowing through the device of FIG. 1 is plotted as a function of temperature.
Figure 5:
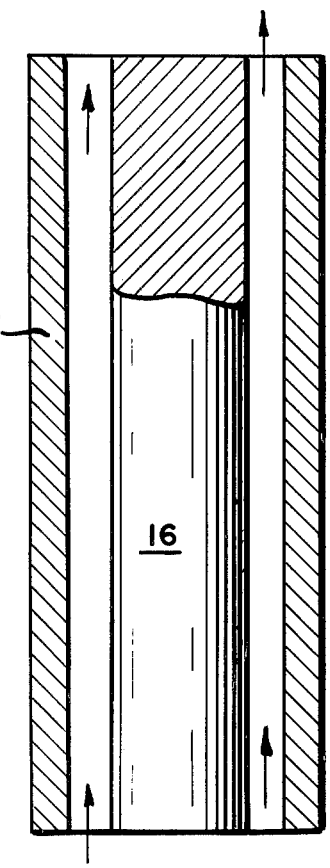
FIG. 5 is a sketch of a second embodiment of the invention.

Operation of the device on a sodium stream will next be described with particular reference to the graphs of FIGS. 2, 3 and 4. The total pressure drop is the sum of frictional (hydraulic) pressure drop and magnetic pressure drop. See FIG. 3. At a given flow rate increasing temperature gradually reduces the hydraulic pressure drop because of reduced viscosity. However, the magnetic pressure drop decreases slowly only until the curie temperature is approached. In this region, a rapid reduction in flux causes a large increase in pressure drop for a small change in temperature. As described, therefore, the magnetic pressure drop is several times greater than the hydraulic pressure drop and hence a large change in the total presssure drop results from a relatively small change in temperature. See FIG. 2.

Figure 4:
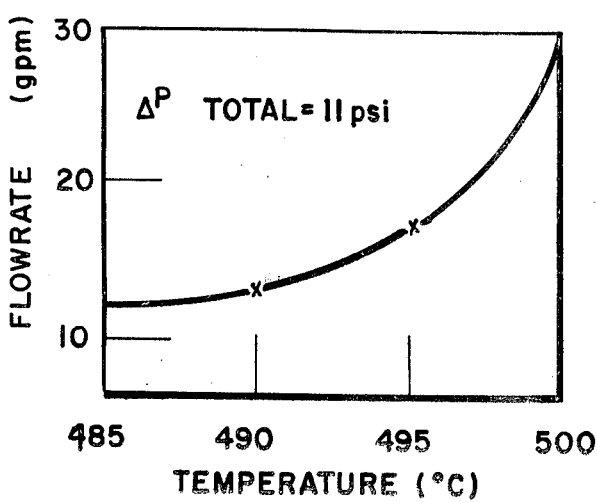
FIG. 4 is a graph in which the flow rate of a liquid metal flowing through the device of FIG. 1 is plotted as a function of temperature.

FIG. 4 shows calculated flow rates for a constant total pressure drop for a small change in temperature. A 10° C. temperature change causes a doubling of the flow rate. In the particular case of an LMFBR blanket assembly where the assembly power doubles due to breeding, the temperature could be stabilized to within 10° C. by this device. Thus for an LMFBR blanket assembly, as assembly power increases, assembly temperature increases and the orific pressure drop decreases to allow more flow. This in turn reduces the temperature so that the device is self regulating. embodiment of the invention is described. In this embodiment a rod-shaped ferromagnetic core 16 formed of a curie material having a curie temperature at which a change in the flow rate of the liquid metal is desired is axially disposed within a cylindrical magnet 17 defining therebetween a flow path for a liquid metal. The effect on the flow rate of an increase in temperature of the liquid metal is the same as in FIG. 1.

A third embodiment is disclosed in FIG. 6. According to this embodiment, a magnet 18 has opposed N and S poles. In the gap between the poles is a flow duct 19 enclosing a bar-shaped ferromagnetic core 20 disposed parallel to the faces of the magnet and separated on the top and bottom from duct 19 by a flow channel 21. This device also functions the same as the device of FIG. 1. While it could not be employed in a reactor to orifice blanket elements, it could be useful in other arts.

FIG. 7 illustrates how an opposite effect can be attained. In this device a magnet 22 having opposed N and S poles has a duct 23 disposed in the gap therebetween. Within the duct 23 and at opposite sides thereof are a pair of ferromagnetic bars 24 disposed longitudinal to the duct and transverse to the gap between poles of the magnet defining therebetween flow path 25 for liquid metal. The ferromagnetic bars 24 are formed of a curie material having a curie temperature at which a change in the flow rate of the liquid metal is desired. In this geometry the ferromagnetic material 24 is a shunt when the temperature is below the curie point. There is accordingly less flow impedance. Above the curie point, the ferromagnetic material becomes paramagnetic and shunts less of the magnetic field. Thus there is more flow impedance and, as the temperature rises past the curie point, the flow decreases.

The embodiments of the invention in which an exclusive property or privilege is claimed are defined as follows:

1. A temperature-dependent liquid metal flow rate control device comprising a magnet and a member formed of a curie material having a curie temperature at which a change in the flow rate of the liquid metal is desired, said magnet and curie material being spaced to establish therebetween a flow path for liquid metal whereby flow of liquid metal along the flow path is impeded at temperatures at which the liquid metal flows through a large magnetic flux and flow impedance is reduced at temperatures at which magnetic lines of force are shunted away from the liquid metal flow path.

2. Flow rate control device according to claim 1 wherein a rod-shaped ferromagnetic core formed of a curie material is axially disposed within a cylindrical magnet and spaced therefrom defining therebetween the flow path for liquid metal.

3. Flow rate control device according to claim 1 wherein the magnet has opposed N and S poles, there being a flow duct for liquid metal disposed in the gap between the N and S poles, said curie material consisting of a bar-shaped core disposed longitudinally in the flow duct oriented parallel to the faces of the magnet and defining on both sides of the curie material the flow path for liquid metal.

4. Flow rate control device according to claim 1 wherein the magnet has opposed N and S poles, there being a flow duct for liquid metal disposed in the gap between the N and S poles, said curie material consisting of a pair of bars disposed within the flow duct and at opposite sides thereof oriented perpendicularly to the faces of the poles of the magnet.

5. Flow rate control device according to claim 1 wherein a rod-shaped magnet is axially disposed within a cylindrical member formed of a curie material and spaced therefrom and including a cylindrical iron shunt disposed in the gap between the magnet and the curie material.

6. Flow rate control device according to claim 5 including iron pole pieces of the same diameter as the iron shunt attached to both ends of the magnet and a thin-wall tube disposed between the iron shunt and the curie material and spaced from the curie material to define therebetween the flow path for liquid metal.

7. Flow rate control device according to claim 6 wherein the curie material is 50% iron and 50% nickel having a curie temperature of 500° C.

* * * * *